United States Patent
Song et al.

(10) Patent No.: US 11,293,903 B2
(45) Date of Patent: Apr. 5, 2022

(54) APPARATUS FOR DIAGNOSING CRACK IN BATTERY PACK AND BATTERY PACK AND VEHICLE INCLUDING THE SAME

(71) Applicant: LG Chem, Ltd., Seoul (KR)

(72) Inventors: Seung-Ho Song, Daejeon (KR);
Jeong-In Pak, Daejeon (KR);
Myung-Su Hong, Daejeon (KR);
Yong-Seok Choi, Daejeon (KR)

(73) Assignee: LG Energy Solution, Ltd.

( * ) Notice: Subject to any disclaimer, the term of this patent is extended or adjusted under 35 U.S.C. 154(b) by 166 days.

(21) Appl. No.: 16/623,568

(22) PCT Filed: Mar. 6, 2019

(86) PCT No.: PCT/KR2019/002614
§ 371 (c)(1),
(2) Date: Dec. 17, 2019

(87) PCT Pub. No.: WO2019/172655
PCT Pub. Date: Sep. 12, 2019

(65) Prior Publication Data
US 2020/0408718 A1    Dec. 31, 2020

(30) Foreign Application Priority Data
Mar. 6, 2018 (KR) .................. 10-2018-0026445

(51) Int. Cl.
*G01N 29/12* (2006.01)
*G01N 29/04* (2006.01)
*G01N 29/46* (2006.01)

(52) U.S. Cl.
CPC ........... *G01N 29/12* (2013.01); *G01N 29/043* (2013.01); *G01N 29/46* (2013.01)

(58) Field of Classification Search
CPC ...... G01N 29/12; G01N 29/043; G01N 29/46; G01N 29/14; G01N 29/4454; G01N 2291/2697

See application file for complete search history.

(56) References Cited

U.S. PATENT DOCUMENTS

| 2007/0185620 A1 | 8/2007 | Van Baren |
| 2016/0101603 A1 | 4/2016 | Boote |

(Continued)

FOREIGN PATENT DOCUMENTS

| CN | 1946997 A | 4/2007 |
| CN | 103847761 A | 6/2014 |

(Continued)

OTHER PUBLICATIONS

International Search Report for Application No. PCT/KR2019/002614 dated Jun. 26, 2019, 2 pages.

(Continued)

*Primary Examiner* — Tarun Sinha
(74) *Attorney, Agent, or Firm* — Lerner, David, Littenberg, Krumholz & Mentlik, LLP

(57) ABSTRACT

Provided is an apparatus for diagnosing a crack in a battery pack, and a battery pack and a vehicle including the same. The apparatus includes a sensing unit configured to generate a vibration signal indicating time-dependent changes in vibration of the battery pack and a processor. The processor generates spectral density data using the vibration signal. The processor detects a plurality of peaks from the spectral density data, and diagnoses whether the battery pack is cracked or not based on the plurality of peaks.

12 Claims, 5 Drawing Sheets

(56) References Cited

U.S. PATENT DOCUMENTS

2016/0207552 A1* 7/2016 Mian .................. G01H 1/00
2016/0258836 A1   9/2016 Raman et al.
2017/0261473 A1   9/2017 Sung et al.

FOREIGN PATENT DOCUMENTS

| JP | 2005214893 A | 8/2005 |
| JP | 2016522504 A | 7/2016 |
| JP | 2016191554 A | 11/2016 |
| KR | 20060012556 A | 2/2006 |
| KR | 20120037154 A | 4/2012 |
| KR | 20140117154 A | 10/2014 |
| KR | 20140139955 A | 12/2014 |
| KR | 20150045594 A | 4/2015 |
| KR | 20160108204 A | 9/2016 |
| KR | 20160109062 A | 9/2016 |

OTHER PUBLICATIONS

Chinese Search Report for Application No. 201980003416.X dated Nov. 30, 2021, 2 pages.

* cited by examiner

APPARATUS FOR DIAGNOSING CRACK IN BATTERY PACK AND BATTERY PACK AND VEHICLE INCLUDING THE SAME

CROSS-REFERENCE TO RELATED APPLICATIONS

This application is a national phase entry under 35 U.S.C. § 371 of International Application No. PCT/KR2019/002614 filed Mar. 6, 2019, which claims priority from Korean Patent Application No. 10-2018-0026445 filed on Mar. 6, 2018, the disclosures of which are incorporated herein by reference.

TECHNICAL FIELD

The present disclosure relates to an apparatus for diagnosing whether a battery pack is cracked or not, and a battery pack and a vehicle including the same.

BACKGROUND ART

In general, secondary (rechargeable) batteries are batteries that can be semipermanently used because they are charged with electricity produced by the electric current supplied from an external source of power during oxidation and reduction reactions of a material between the positive electrode and the negative electrode. Primary (disposable) batteries are cannot be reused and require significant cost to collect or recycle, whereas secondary batteries can be recharged repeatedly. Additionally, secondary batteries are the core of not only hand-held electronic devices such as laptop computers, mobile phones and camcorders but also electric vehicles, and due to high added value, they are considered to be one of the 21st century's 'top three electronic components' along with semiconductors and displays. Particularly, the global secondary battery market amounts to 20 billion dollars as of 2011, and with the growing market of secondary batteries for medium- and large-scale energy storage in tandem with electric vehicle market, secondary batteries are expected to expand the market rapidly in the near future.

Secondary batteries are classified into nickel batteries, ion batteries, lithium ion batteries, polymer batteries, lithium polymer batteries and lithium sulfur batteries according to the type of materials used to fill the secondary batteries. After the emergence of nickel cadmium batteries and nickel hydrogen batteries in the 1980s, accompanying the emergence of lithium-based secondary batteries in the 1990s, the introduction of lithium polymer batteries in the 2000s has lead to a new age in secondary batteries.

With the recent trend towards compact and lightweight design of electronic devices and the widespread use of mobile electronic devices, lithium ion batteries currently occupy the majority of the secondary battery market. A lithium ion battery is manufactured by filling an organic electrolyte solution or a polymer electrolyte solution in between positive and negative electrodes made of materials capable of intercalating and deintercalating lithium ions, and the battery generates electrical energy by oxidation and reduction reactions during intercalation and deintercalation of lithium ions at the positive electrode and the negative electrode. Due to their light weight and high capacity advantages, lithium ion batteries are being used in a wide range of applications from low capacity batteries for mobile phones to high capacity batteries for electric vehicles.

Additionally, lithium polymer batteries are an evolved form of lithium ion batteries, and generate electricity using an electrolyte of a solid- or gel-type polymer between the positive electrode and the negative electrode. Advantageously, lithium polymer batteries can be manufactured in various shapes, and achieve the smallest thickness among secondary batteries developed to date.

A secondary battery generally includes a plurality of battery cells, and each battery cell is thin and thus may be prone to cracks. Accordingly, rigidity testing of the produced battery cells is conducted, and prior test methods have been performed by sampling some battery cells before mounting the produced battery cells in a vehicle, and inspecting cracks and rigidity of the battery cells by applying an external force until the sampled battery cells are broken.

However, because earlier battery cell test methods are performed before mounting the battery cells in the vehicle as described above, crack inspection is impossible after mounting the battery cells in the vehicle, and moreover, because testing is conducted in a destructive manner, it is impossible to test the rigidity of all the produced battery cells.

DISCLOSURE

Technical Problem

The present disclosure is directed to providing an apparatus that converts a vibration signal indicating time-dependent changes in vibration of a battery pack into spectral density data, detects a plurality of peaks from the spectral density data, and diagnoses cracks in the battery pack based on the plurality of peaks.

The objects of the present disclosure are not limited to those mentioned above, and these and other objects and advantages may be understood by the following description and will be apparent from the embodiments of the present disclosure.

Technical Solution

An apparatus for diagnosing a crack in a battery pack according to an aspect of the present disclosure includes a sensing unit, and a processor operably coupled to the sensing unit. The sensing unit is configured to generate a first time-vibration signal indicating time-dependent changes in vibration of the battery pack for a first measurement period, a second time-vibration signal indicating time-dependent changes in vibration of the battery pack for a second measurement period after the first measurement period and a third time-vibration signal indicating time-dependent changes in vibration of the battery pack for a third measurement period after the second measurement period. The processor is configured to generate first spectral density data based on the first time-vibration signal. The processor is configured to generate second spectral density data based on the second time-vibration signal. The processor is configured to generate third spectral density data based on the third time-vibration signal. The processor is configured to detect a first plurality of peaks from the first spectral density data. The processor is configured to detect a second plurality of peaks from the second spectral density data. The processor is configured to detect a third plurality of peaks from the third spectral density data. The processor is configured to determine at least one of the first plurality of peaks as being a first characteristic peak by comparing the first plurality of peaks with the second plurality of peaks. The processor is configured to determine whether the battery pack is cracked or not based on a frequency of one of the third plurality of peaks and a frequency of the first characteristic peak.

The processor may convert the first time-vibration signal into a first frequency-vibration signal, and generate the first spectral density data using the first frequency-vibration signal. The processor may convert the second time-vibration signal into a second frequency-vibration signal, and generate the second spectral density data using the second frequency-vibration signal. The processor may convert the third time-vibration signal into a third frequency-vibration signal, and generate the third spectral density data using the third frequency-vibration signal.

The processor may calculate a first rate of frequency change at a frequency of a first peak based on a difference between the frequency of the first peak and a frequency of a second peak, wherein the first peak is one of the first plurality of peaks and the second peak is one of the second plurality of peaks.

The processor may determine the first peak as being the first characteristic peak when the first rate of frequency change is within a predetermined first reference range.

The processor may determine that the first peak is not the first characteristic peak when the first rate of frequency change is outside of the predetermined first reference range.

The processor may calculate a second rate of frequency change at a frequency of a third peak based on a difference between the frequency of the first characteristic peak and the frequency of the third peak, wherein the third peak is one of the third plurality of peaks.

The processor may determine that the battery pack is uncracked when the second rate of frequency change is within a predetermined second reference range.

The processor may determine that the battery pack is cracked when the second rate of frequency change is outside of the predetermined second reference range.

The sensing unit may be configured to generate a fourth time-vibration signal indicating time-dependent changes in vibration of the battery pack for a fourth measurement period after the third measurement period. The processor may generate fourth spectral density data based on the fourth time-vibration signal. The processor may detect a fourth plurality of peaks from the fourth spectral density data. The processor may determine at least one of the third plurality of peaks as being a second characteristic peak by comparing the third plurality of peaks with the fourth plurality of peaks. The processor may determine whether the battery pack is cracked or not based on the number of the first characteristic peaks and the number of the second characteristic peaks.

The processor may be configured to determine that the battery pack is cracked when the number of the second characteristic peaks is larger than the number of the first characteristic peaks.

A battery pack according to another aspect of the present disclosure includes the apparatus.

A vehicle according to still another aspect of the present disclosure includes the apparatus.

Advantageous Effects

According to the present disclosure, spectral density data is acquired from a vibration signal indicating time-dependent changes in vibration of a battery pack, a plurality of peaks is detected from the spectral density data, and a crack in the battery pack is diagnosed based on the plurality of peaks. Accordingly, it is possible to accurately diagnose cracks in a battery pack while the battery pack is coupled to an electrical load without electrically separating the battery pack from the electrical load.

Figure 1:
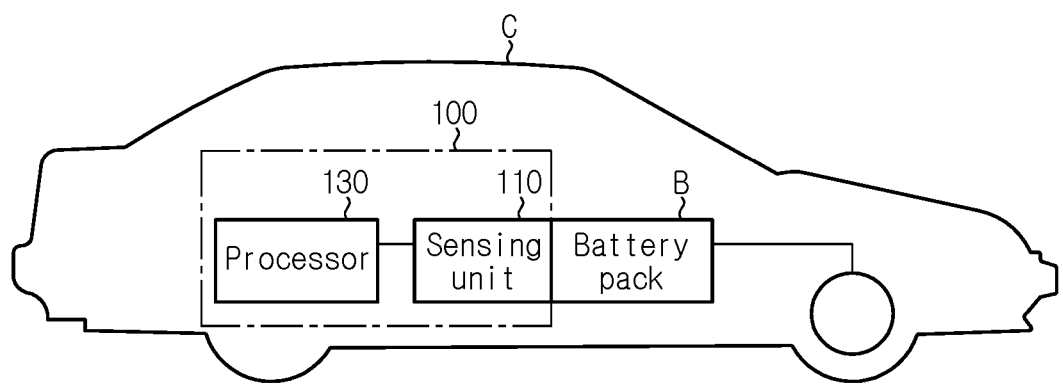
FIG. 1 is a diagram showing an apparatus for diagnosing cracks in a battery according to an embodiment of the present disclosure, included in a vehicle provided with a battery pack.

The accompanying drawings illustrate a preferred embodiment of the present disclosure, and together with the detailed description of the present disclosure described below, serve to provide a further understanding of the technical aspects of the present disclosure, and thus the present disclosure should not be construed as being limited to the drawings.

MODE FOR DISCLOSURE

Hereinafter, the preferred embodiments of the present disclosure will be described in detail with reference to the accompanying drawings. Prior to the description, it should be understood that the terms or words used in the specification and the appended claims should not be construed as being limited to general and dictionary meanings, but rather interpreted based on the meanings and concepts corresponding to the technical aspects of the present disclosure on the basis of the principle that the inventor is allowed to define the terms appropriately for the best explanation.

Therefore, the embodiments described herein and illustrations shown in the drawings are just a most preferred embodiment of the present disclosure, but not intended to fully describe the technical aspects of the present disclosure, so it should be understood that a variety of other equivalents and modifications could be made thereto at the time of filing the application.

Additionally, in describing the present disclosure, when it is determined that a certain detailed description of relevant known elements or functions renders the key subject matter of the present disclosure ambiguous, the detailed description is omitted herein.

The terms including the ordinal number such as "first", "second" and the like, are used to distinguish one element from another among various elements, but not intended to limit the elements by the terms.

Unless the context clearly indicates otherwise, it will be understood that the term "comprises" or "includes" when used in this specification, specifies the presence of stated elements, but does not preclude the presence or addition of one or more other elements. Additionally, the term <control unit> as used herein refers to a processing unit of at least one function or operation, and this may be implemented by hardware or software alone or in combination.

In addition, throughout the specification, it will be further understood that when an element is referred to as being "connected to" another element, it can be directly connected to the other element or intervening elements may be present.

Figure 2:
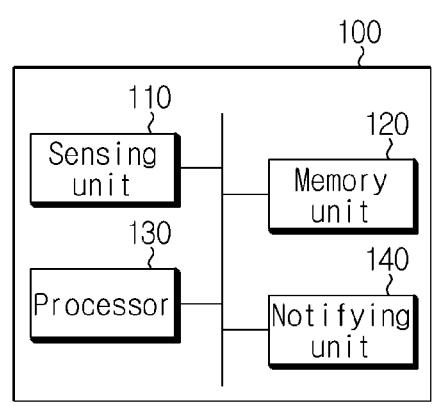
FIG. 2 is a schematic diagram showing a configuration of the apparatus of FIG. 1.
Figure 3:
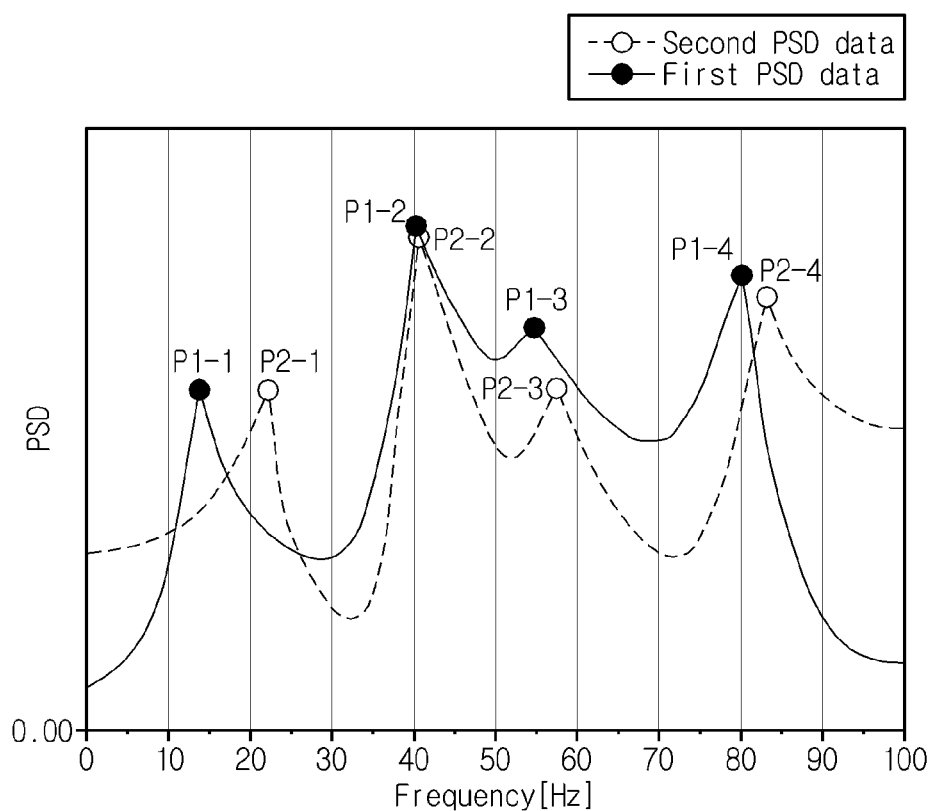
FIG. 3 is a graph exemplarily showing a difference between first spectral density data and second spectral density data.

FIG. 1 is a diagram showing an apparatus for diagnosing cracks in a battery according to an embodiment of the present disclosure, included in a vehicle provided with a battery pack, FIG. 2 is a schematic diagram showing a configuration of the apparatus of FIG. 1, and FIG. 3 is a graph exemplarily showing a difference between first spectral density data and second spectral density data.

Referring to FIGS. 1 and 2, the apparatus 100 may be included in a vehicle C provided with a battery pack B. The apparatus 100 may be coupled to the battery pack B to diagnose whether the battery pack B is cracked or not.

The apparatus 100 may be included in a battery management system provided in the battery pack B.

The apparatus 100 may include a sensing unit 110, a memory unit 120, a processor 130 and a notifying unit 140.

The battery pack B includes a plurality of unit cells electrically connected in series and/or in parallel. Of course, the present disclosure is not limited to the battery pack B including one unit cell.

The unit cell is not limited to a particular type and includes any cell type that can be recharged repeatedly. For example, the unit cell may be a pouch-type lithium polymer battery.

The battery pack B may be electrically coupled to various types of external devices through an external terminal. The external device may be a device that drives using power, and may be, for example, an electric vehicle, a hybrid electric vehicle, a flying object such as a drone, a large-capacity energy storage system (ESS) included in an electrical grid, or a mobile device. In this case, the battery pack B may include some or all unit cells included in a modularized battery pack mounted in the external device.

The external terminal of the battery pack B may be provided coupleably to a charging device. The charging device may be selectively electrically coupled to the battery pack B by the control of the external device mounted in the battery pack B.

The sensing unit 110 is operably coupled to the processor 130. That is, the sensing unit 110 may transmit an electrical signal to the processor 130, or receive an electrical signal from the processor 130.

The sensing unit 110 may be configured to measure vibration of the battery pack B, and generate a vibration signal indicating the measured vibration. In detail, the sensing unit 110 may include a vibration sensor (for example, an acceleration sensor) that is attached to the surface of the battery pack B. The sensing unit 110 may generate the vibration signal in a predetermined cycle using the vibration sensor, and provide the vibration signal to the processor 130.

The vibration signal may include a vibration component derived from resonance characteristics of the battery pack B and a vibration component derived from an outside situation (for example, driving of the vehicle C).

When the processor 130 receives the vibration signal from the sensing unit 110, the processor 130 may convert the vibration signal into a digital value through signal processing, and store the digital value in the memory unit 120.

The memory unit 120 is a semiconductor memory device, and records, deletes and updates data generated by the processor 130 and stores a plurality of program codes for diagnosing whether the battery pack B is cracked or not. Additionally, the memory unit 120 may store preset values of predetermined parameters used when practicing the present disclosure.

The memory unit 120 is not limited to a particular type, and includes any type of semiconductor memory device known as being capable of recording, deleting and updating data. For example, the memory unit 120 may include DRAM, SDRAM, flash memory, ROM, EEPROM and register. The memory unit 120 may further include a storage medium that stores program codes defining the control logics of the processor 130. The storage medium includes a non-volatile memory device such as flash memory or hard disk. The memory unit 120 may be physically separated from the processor 130, and the memory unit 120 and the processor 130 may be integrated into one.

The processor 130 may generate spectral density data using the vibration signal from the sensing unit 110. That is, the vibration signal generated by the sensing unit 110 is a sort of a function or data represented in the time domain, and is converted into spectral density data by the processor 130. In detail, the processor 130 may convert the vibration signal in the time domain (hereinafter referred to as 'time-vibration signal') generated by the sensing unit 110 into a vibration signal in frequency domain (hereinafter referred to as 'frequency-vibration signal'). For example, the processor 130 may convert the time-vibration signal generated by the sensing unit 110 into the frequency-vibration signal using Fast Fourier transform (FFT). Subsequently, the processor 130 may generate spectral density data using the frequency-vibration signal.

The spectral density data may be data indicating the magnitude of energy for each frequency component of the frequency-vibration signal, namely, a power spectral density (PSD).

The processor 130 may generate first spectral density data (hereinafter referred to as 'first PSD data' or 'first PSD curve') using the time-vibration signal indicating time-dependent changes in vibration measured by the sensing unit 110 for a first measurement period.

The processor 130 may detect a plurality of peaks from the first PSD data. In detail, the processor 130 may detect, based on the first PSD data, a frequency at which with an infinitesimal change in frequency, a change in the first PSD data increases and then decreases, and PSD at the frequency as the peak of the first PSD data.

To this end, the processor 130 may calculate a first order derivative by differentiating an approximation function corresponding to the first PSD data, and calculate a second order derivative by differentiating the first order derivative of the approximation function again. The processor 130 may detect, as the peak of the first PSD data, each position determined by a frequency at which a first order differential coefficient of the approximation function corresponding to the first PSD data is 0 and a second order differential coefficient is a negative number, and a PSD value at the corresponding frequency.

After the first measurement period has passed, the processor 130 may calculate second spectral density data (hereinafter referred to as 'second PSD data' or 'second PSD curve') using a time-vibration signal indicating time-dependent changes in vibration measured by the sensing unit 110 for a second measurement period. The second measurement period may be a period in a different outside situation from the first measurement period.

In the same way as the process of detecting the plurality of peaks from the first PSD data, the processor 130 may detect a plurality of peaks from the second PSD data.

The processor 130 may determine at least one of the plurality of peaks detected from the first PSD data as a first characteristic peak by comparing the plurality of peaks detected from the first PSD data with the plurality of peaks detected from the second PSD data.

In detail, the processor 130 may determine at least one of the plurality of peaks from the first PSD data as a first characteristic peak based on a first rate of frequency change at the frequency of the at least one of the plurality of peaks from the first PSD data. In detail, the processor 130 may calculate the first rate of frequency change based on a difference between a frequency of one of the plurality of peaks detected from the first PSD data and a frequency of one of the plurality of peaks detected from the second PSD data.

The processor 130 may calculate the first rate of frequency change using the following Equation 1.

$$V_{f1}=(f2-f1)/f1 \times 100 \qquad \text{<Equation 1>}$$

Here, $V_{f1}$ denotes the first rate of frequency change, f1 denotes the frequency of one of the plurality of peaks detected from the first PSD data, and f2 denotes the frequency of one of the plurality of peaks detected from the second PSD data.

As shown in FIG. 3, the plurality of peaks P1-1~P1-4 may be detected from the first PSD data, and the plurality of peaks P2-1~P2-4 may be detected from the second PSD data.

For example, the processor 130 may utilize, as f1 of Equation 1, a frequency of a peak (for example, P1-1) in a particular order (for example, first) in frequency among the plurality of peaks P1-1~P1-4 detected from the first PSD data, and utilize, as f2, a frequency of a peak (for example, P2-1) in the particular order among the plurality of peaks P2-1~P2-4 detected from the second PSD data.

In another example, the processor 130 may utilize, as f2, a frequency having a smallest difference from the frequency selected as f1 among the frequencies of the plurality of peaks P2-1~P2-4 detected from the second PSD data.

The processor 130 may calculate the first rate of frequency change based on a difference between the frequency of the peak P1-1 and the frequency of the peak P2-1. The processor 130 may calculate the first rate of frequency change using a difference between the frequency of the peak P1-2 and the frequency of the peak P2-2. The processor 130 may calculate the first rate of frequency change using a difference between the frequency of the peak P1-3 and the frequency of the peak P2-3. The processor 130 may calculate the first rate of frequency change using a difference between the frequency of the peak P1-4 and the frequency of the peak P2-4.

For example, the processor 130 may calculate 69.2% as the first rate of frequency change using a difference between 13 Hz which is the frequency of the peak P1-1 and 22 Hz which is the frequency of the peak P2-1. In another example, the processor 130 may calculate 1.25% as the first rate of frequency change using a difference between 40 Hz which is the frequency of the peak P1-2 and 40.5 Hz which is the frequency of the peak P2-2.

The processor 130 may determine whether the first rate of frequency change is within a predetermined first reference range, then based on the determination result, may determine at least one of the plurality of peaks P1-1~P1-4 detected from the first PSD data as the first characteristic peak.

In detail, when the first rate of frequency change acquired using a frequency of a particular peak among the plurality of peaks P1-1~P1-4 as f1 of Equation 1 is within the predetermined first reference range, the processor 130 may determine the particular peak as the first characteristic peak. On the contrary, when the first rate of frequency change acquired using the frequency of the particular peak among the plurality of peaks P1-1~P1-4 as f1 of Equation 1 is outside of the predetermined first reference range, the processor 130 may not determine the particular peak as the first characteristic peak.

Assume that the predetermined first reference range is −10~10%. As the first rate of frequency change of 1.25% calculated using the difference between the frequency of the peak P1-2 and the frequency of the peak P2-2 is within the predetermined first reference range, the processor 130 may determine the peak P1-2 as the first characteristic peak. On the contrary, as the first rate of frequency change of 69.2% calculated using the difference between the frequency of the peak P1-1 and the frequency of the peak P2-1 is outside of the predetermined first reference range, the processor 130 may not determine the peak P1-1 as the first characteristic peak.

Accordingly, the processor 130 may only select the second peak P1-2 among the plurality of peaks P1-1~P1-4 as the first characteristic peak. The first characteristic peak P1-2 may be derived from a vibration component that occurs due to the resonance characteristics of the battery pack B itself. Hereinafter, for convenience of description, assume that only the peak P1-2 among the plurality of peaks P1-1~P1-4 detected from the first PSD data is determined as the first characteristic peak.

Among the plurality of peaks P1-1~P1-4, the remaining peaks P1-1, P1-3, P1-4 not determined as the first characteristic peak P1-2 may be handled as those generated by the external environment (for example, driving of the vehicle C), not the resonance characteristics of the battery pack B itself.

Figure 4:
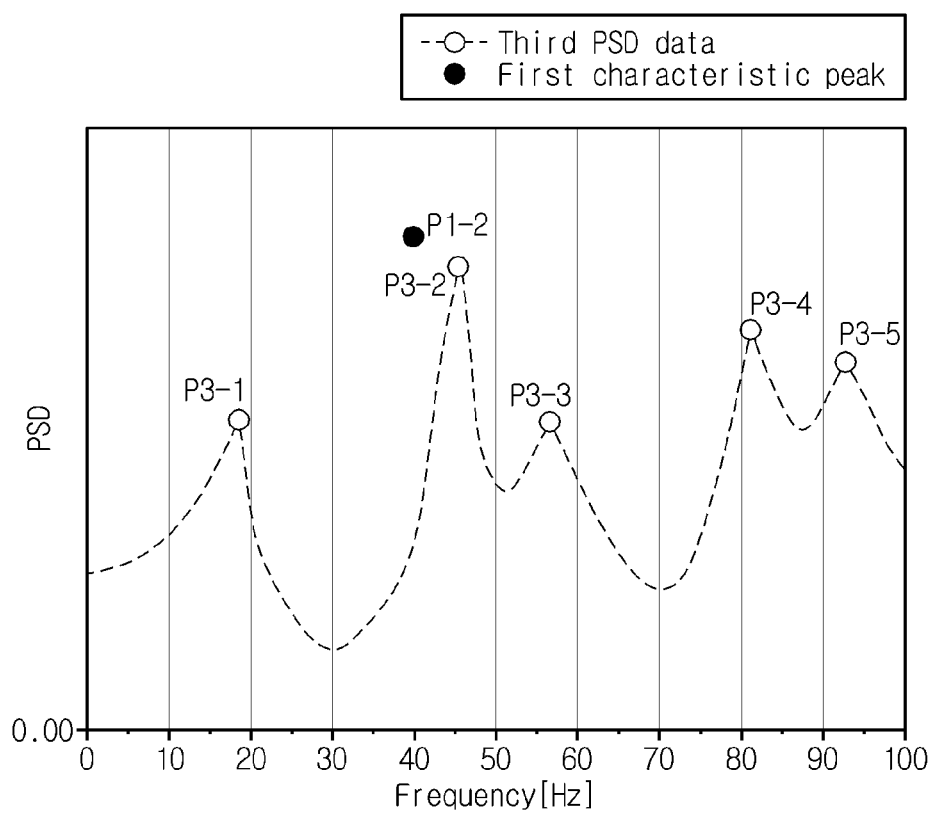
FIG. 4 is a graph showing a first characteristic peak and third power spectral density (PSD) data.
Figure 5:
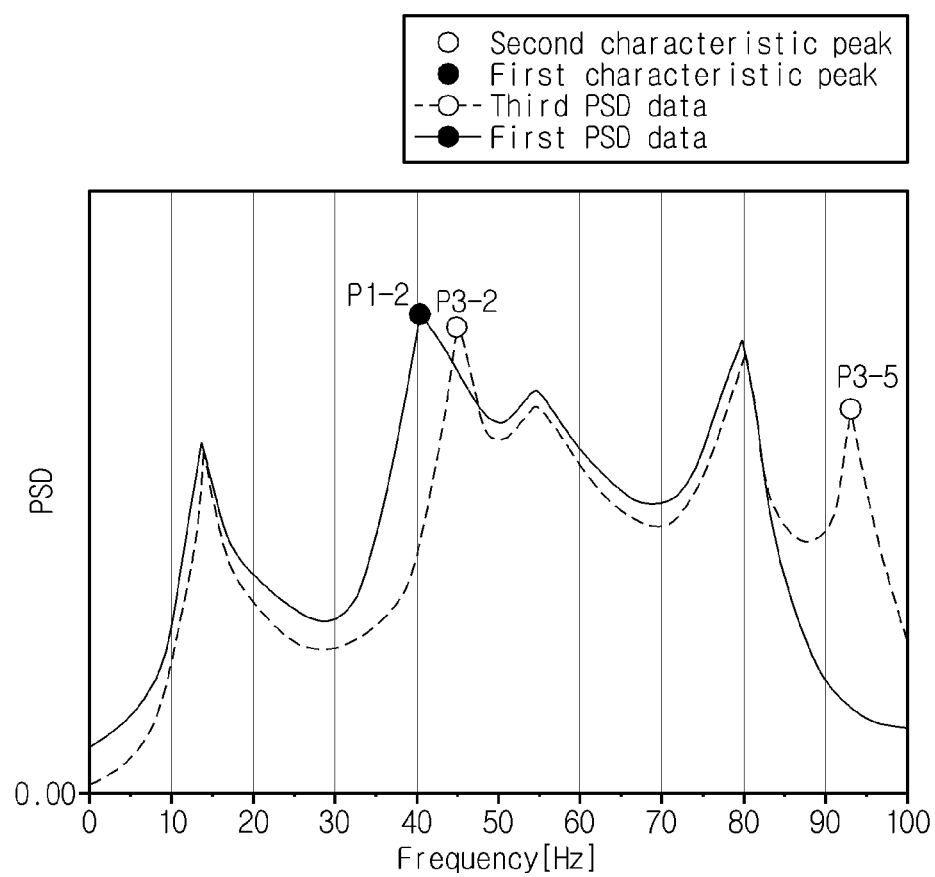
FIG. 5 is a graph exemplarily showing a difference between first PSD data and third PSD data.

FIG. 4 is a graph showing the first characteristic peak and the third PSD data, and FIG. 5 is a graph exemplarily showing a difference between the first PSD data and the third PSD data.

Referring to FIG. 4, after the second measurement period has passed, the processor 130 may generate third spectral density data (hereinafter referred to as 'third PSD data' or 'third PSD curve') using a time-vibration signal indicating time-dependent changes in vibration measured by the sensing unit 110 for a third measurement period. The third measurement period may be a period in a different outside situation from the second measurement period.

In the same way as the process of detecting the plurality of peaks P1-1~P1-4 from the first PSD data, the processor 130 may detect a plurality of peaks P3-1~P3-5 from the third PSD data. In detail, the processor 130 converts the time-vibration signal indicating time-dependent changes in vibration measured for the third measurement period into a frequency-vibration signal. Subsequently, the processor 130 may generate the third PSD data using the frequency-vibration signal associated with the third measurement period. Then, the processor 130 may detect the plurality of peaks P3-1~P3-5 from the third PSD data.

The first measurement period and the second measurement period may be a period required to determine the first characteristic peak, and the third measurement period may be a period required to diagnose whether the battery pack B is cracked or not.

The processor 130 may determine the first characteristic peak P1-2 before a predetermined period has passed from the time when the battery pack B was mounted in the vehicle C (for example, the first measurement period, the second measurement period), and diagnose whether the battery pack B is cracked or not based on the time-dependent changes in vibration of the battery pack B measured for the third measurement period after the predetermined period has passed from the time when the battery pack B was mounted in the vehicle C.

The processor 130 may calculate a second rate of frequency change based on a difference between the frequency of the first characteristic peak P1-2 and frequency of one of the plurality of peaks detected from the third PSD data. In detail, the processor 130 may select one peak (for example, P3-2) having a frequency closet to the frequency of the first characteristic peak P1-2 among the plurality of peaks P3-1~P3-5 detected from the third PSD data.

Subsequently, the processor 130 may calculate the second rate of frequency change based on a difference between the frequency of the first characteristic peak P1-2 and the frequency of the selected peak (for example, P3-2).

The processor 130 may calculate the second rate of frequency change using the following Equation 2.

$$V_{f2} = (f3 - fc)/fc \times 100 \qquad \text{<Equation 2>}$$

Here, $V_{f2}$ denotes the second rate of frequency change, fc denotes the frequency of the first characteristic peak P1-2, and f3 denotes the frequency of the selected peak (for example, P3-2) among the plurality of peaks P3-1~P3-5 from the third PSD data.

For example, the processor 130 may select, as f3 of Equation 2, the peak P3-2 having 45 Hz frequency closest to 40 Hz frequency of the first characteristic peak P1-2 among the frequencies of each of the plurality of peaks P3-1~P3-5.

Subsequently, the processor 130 may calculate the second rate of frequency change of 12.5% using a difference between 40 Hz frequency corresponding to the first characteristic peak P1-2 and 45 Hz frequency of the selected peak P3-2 among the plurality of peaks P3-1~P3-5.

The processor 130 may determine whether the second rate of frequency change is within a predetermined second reference range, and diagnose whether the battery pack B is cracked or not based on the determination result. In detail, when the second rate of frequency change is outside of the predetermined second reference range, the processor 130 may diagnose that the battery pack B is cracked. On the contrary, when the second rate of frequency change is within the predetermined second reference range, the processor 130 may diagnose that the battery pack B is not cracked.

Assume that the predetermined second reference range is −10~10%. As the calculated the second rate of frequency change of 12.5% is outside the predetermined second reference range, the processor 130 may diagnose that the battery pack B is cracked.

After the third measurement period has passed, the processor 130 may generate fourth spectral density data (hereinafter referred to as 'fourth PSD data' or 'fourth PSD curve') using a time-vibration signal indicating time-dependent changes in vibration measured by the sensing unit 110 for a fourth measurement period. Similar to the third measurement period, the fourth measurement period may be a period required to diagnose whether the battery pack B is cracked or not. For convenience of description, illustration of the fourth PSD data is omitted herein.

In the same way as the process of detecting the plurality of peaks from each of the first PSD data, the second PSD data and the third PSD data, the processor 130 may detect a plurality of peaks from the fourth PSD data. In detail, the processor 130 converts the time-vibration signal indicating time-dependent changes in vibration measured for the fourth measurement period into a frequency-vibration signal. Subsequently, the processor 130 may generate the fourth PSD data using the frequency-vibration signal associated with the fourth measurement period. Subsequently, the processor 130 may detect the plurality of peaks from the fourth PSD data.

Subsequently, the processor 130 may determine at least one of the plurality of peaks detected from the third PSD data as a second characteristic peak by comparing the third PSD data with the fourth PSD data. In detail, the processor 130 may calculate a third rate of frequency change using Equation 1. In this case, $V_{f1}$ of Equation 1 is the third rate of frequency change, f1 is the frequency of one of the plurality of peaks detected from the third PSD data, and f2 is the frequency of one of the plurality of peaks detected from the fourth PSD data. In this case, f2 may be the frequency of one peak having a smallest difference from f1 among the plurality of peaks detected from the fourth PSD data.

When the third rate of frequency change lies within a predetermined third reference range, the processor 130 may determine a particular peak of the third PSD data having, as its frequency, f1 used to calculate the third rate of frequency change as the second characteristic peak. On the contrary, when the third rate of frequency change acquired using the frequency of the particular peak of the third PSD data as f1, is outside of the predetermined third reference range, the processor 130 may not determine the particular peak of the third PSD data as the second characteristic peak. The predetermined third reference range may be equal to or different from the predetermined first reference range.

The processor 130 may diagnose whether the battery pack B is cracked or not based on the number of first characteristic peaks calculated by comparing the first PSD data with the second PSD data and the number of second characteristic peaks calculated by comparing the third PSD data with the fourth PSD data.

When the number of first characteristic peaks and the number of second characteristic peaks are unequal (for example, the number of second characteristic peaks is larger than the number of first characteristic peaks), the processor 130 may diagnose that the battery pack B is cracked. On the contrary, when the number of first characteristic peaks and the number of second characteristic peaks are equal, the processor 130 may diagnose that the battery pack B is uncracked.

For example, as shown in FIG. 5, in the case of one first characteristic peak P1-2 and two second characteristic peaks P3-2, P3-5, the processor 130 may diagnose that the battery pack B is cracked. Each characteristic peak is derived from the resonance characteristics of the battery pack B itself. Accordingly, a change in the number of characteristic peaks (for example, an increase in the number of characteristic peaks over time) indicates a change in the resonance characteristics of the battery pack B itself due to crack in the battery pack B.

Through this, the processor 130 may diagnose whether the battery pack B is cracked or not when the vehicle C having the mounted battery pack B is stopped as well as while the vehicle C is driving.

The processor 130 may transmit a message indicating the crack diagnosis result of the battery pack B to the external device through a communication terminal.

The processor 130 may selectively include an application-specific integrated circuit (ASIC), a chipset, a logic circuit, a register, a communication modem and a data processing device known in the art to execute various control logics. At least one of the various control logics that can be executed by the processor 130 may be combined, and the combined control logics may be written in computer-readable coding systems and stored in computer-readable recording media.

The recording media is not limited to a particular type and includes any type that can be accessed by the processor 130 included in the computer. For example, the recording media may include at least one selected from the group consisting of ROM, RAM, register, CD-ROM, magnetic tape, hard disk, floppy disk and an optical data recording device. Additionally, the coding system may be modulated to a carrier signal and included in a communication carrier at a specific point in time, and may be stored and executed in computers connected via a network in distributed manner Additionally, functional programs, codes and segments for implementing the combined control logics may be easily inferred by programmers in the technical field pertaining to the present disclosure.

The notifying unit 140 may output the results of diagnosis executed by the processor 130 to the external device. In more detail, the notifying unit 140 may include at least one of a display unit to display the diagnosis result using at least one of a symbol, a figure and a code and a speaker to output the diagnosis result using audio.

A battery management apparatus according to the present disclosure may include the apparatus 100 described above. Through this, the battery management apparatus may diagnose whether the battery pack B managed by the battery management apparatus is cracked or not.

The vehicle C according to the present disclosure may include the apparatus 100.

The embodiments of the present disclosure described hereinabove are not implemented only through the apparatus and method, and may be implemented through programs that perform functions corresponding to the configurations of the embodiments of the present disclosure or recording media having the programs recorded thereon, and such implementation may be easily achieved by those skilled in the art from the disclosure of the embodiments previously described.

While the present disclosure has been hereinabove described with regard to a limited number of embodiments and drawings, the present disclosure is not limited thereto and it is obvious to those skilled in the art that various modifications and changes may be made thereto within the technical aspects of the present disclosure and the equivalent scope of the appended claims.

Additionally, as many substitutions, modifications and changes may be made to the present disclosure described hereinabove by those skilled in the art without departing from the technical aspects of the present disclosure, the present disclosure is not limited by the above-described embodiments and the accompanying drawings, and some or all of the embodiments may be selectively combined to allow various modifications.

What is claimed is:

1. An apparatus for diagnosing a crack in a battery pack, the apparatus comprising:
    a sensing unit configured to generate a first time-vibration signal indicating time-dependent changes in vibration of the battery pack for a first measurement period, a second time-vibration signal indicating time-dependent changes in vibration of the battery pack for a second measurement period after the first measurement period and a third time-vibration signal indicating time-dependent changes in vibration of the battery pack for a third measurement period after the second measurement period; and
    a processor operably coupled to the sensing unit, wherein the processor is configured to:
        generate first spectral density data based on the first time-vibration signal,
        generate second spectral density data based on the second time-vibration signal,
        generate third spectral density data based on the third time-vibration signal, each of the first, second, and third spectral density data comprising data indicating magnitude of energy for each of a plurality of frequency values,
        detect a first plurality of peaks from the first spectral density data,
        detect a second plurality of peaks from the second spectral density data,
        detect a third plurality of peaks from the third spectral density data,
        determine at least one of the first plurality of peaks as being a first characteristic peak based on a comparison between the first plurality of peaks and the second plurality of peaks, and
        determine whether the battery pack is cracked or not based on a frequency value of one of the third plurality of peaks and a frequency value of the first characteristic peak.

2. The apparatus according to claim 1, wherein the processor is configured to:
    convert the first time-vibration signal into a first frequency-vibration signal,
    generate the first spectral density data using the first frequency-vibration signal,
    convert the second time-vibration signal into a second frequency-vibration signal,
    generate the second spectral density data using the second frequency-vibration signal,
    convert the third time-vibration signal into a third frequency-vibration signal, and
    generate the third spectral density data using the third frequency-vibration signal.

3. The apparatus according to claim 1, wherein the processor is configured to calculate a first rate of frequency change at a frequency value of a first peak based on a difference between the frequency value of the first peak and a frequency value of a second peak, wherein the first peak is one of the first plurality of peaks and the second peak is one of the second plurality of peaks.

4. The apparatus according to claim 3, wherein the processor is configured to determine the first peak as being the first characteristic peak when the first rate of frequency change is within a predetermined first reference range.

5. The apparatus according to claim 4, wherein the processor is configured to determine that the first peak is not the first characteristic peak when the first rate of frequency change is outside of the predetermined first reference range.

6. The apparatus according to claim 3, wherein the processor is configured to calculate a second rate of frequency change at a frequency value of a third peak based on a difference between the frequency value of the first characteristic peak and the frequency value of the third peak, wherein the third peak is one of the third plurality of peaks.

7. The apparatus according to claim 6, wherein the processor is configured to determine that the battery pack is uncracked when the second rate of frequency change is within a predetermined second reference range.

8. The apparatus according to claim 7, wherein the processor is configured to determine that the battery pack is cracked when the second rate of frequency change is outside of the predetermined second reference range.

9. The apparatus according to claim 1, wherein the sensing unit is configured to generate a fourth time-vibration signal indicating time-dependent changes in vibration of the battery pack for a fourth measurement period after the third measurement period, and the processor is configured to:

generate fourth spectral density data based on the fourth time-vibration signal, detect a fourth plurality of peaks from the fourth spectral density data, determine at least one of the third plurality of peaks as being a second characteristic peak by comparing the third plurality of peaks with the fourth plurality of peaks, and determine whether the battery pack is cracked or not based on the number of the first characteristic peaks and the number of the second characteristic peaks.

10. The apparatus according to claim 9, wherein the processor is configured to determine that the battery pack is cracked when the number of the second characteristic peaks is larger than the number of the first characteristic peaks.

11. A battery pack comprising the apparatus according to claim 1.

12. A vehicle comprising the apparatus according to claim 1.

* * * * *